United States Patent

Ferrari et al.

[11] Patent Number: 6,104,073
[45] Date of Patent: Aug. 15, 2000

[54] SEMICONDUCTOR INTEGRATED CAPACITIVE ACCELERATION SENSOR AND RELATIVE FABRICATION METHOD

[75] Inventors: Paolo Ferrari, Gallarate; Mario Foroni, Valeggio Sul Mincio; Benedetto Vigna, Potenza; Flavio Villa, Milan, all of Italy

[73] Assignee: SGS-Thomson Microelectronics S.r.l., Agrate Brianza, Italy

[21] Appl. No.: 08/903,511

[22] Filed: Jul. 30, 1997

[30] Foreign Application Priority Data

Jul. 31, 1996 [EP] European Pat. Off. ............. 96830438

[51] Int. Cl.[7] .......................... H01L 29/82; H01L 27/20; H01L 27/01; H01L 21/00
[52] U.S. Cl. .......................... 257/417; 257/254; 257/350; 257/418; 438/52
[58] Field of Search .................................. 257/417–419, 257/347, 350, 254; 438/50–53

[56] References Cited

U.S. PATENT DOCUMENTS

| | | | |
|---|---|---|---|
| 5,408,112 | 4/1995 | Tai et al. | 257/254 |
| 5,495,761 | 3/1996 | Diem | 73/514.3 |
| 5,554,875 | 9/1996 | Hartauer | 257/418 |
| 5,635,739 | 6/1997 | Grieff et al. | 257/254 |
| 5,677,560 | 10/1997 | Zimmer et al. | 257/418 |
| 5,770,883 | 6/1998 | Mizuno et al. | 257/417 |

FOREIGN PATENT DOCUMENTS

| | | | |
|---|---|---|---|
| 0 198 724 | 10/1986 | European Pat. Off. | G01P 15/12 |
| 0 591 554 | 4/1994 | European Pat. Off. | G01P 15/12 |
| 5-102494 | 4/1993 | Japan | 257/417 |
| WO 92/03740 | 3/1992 | WIPO | G01P 15/12 |
| WO 94/28427 | 12/1994 | WIPO | G01P 15/12 |

OTHER PUBLICATIONS

European Search Report from European Patent Application 968304533.8, filed Jul. 31, 1996.
Stiction of Surface Micromachined Structures After Rinsing and Drying: Model and Investigation of Adhesion Mechanisms, Legtenberg et al., Sensors and Actuators A, 43 Dec. (1994) pp. 230–238.
A Surface Michromachined Silicon Accelerometer with On–Chip Detection Circuitry, Kuehnel et al. Elsevier Science S.A., Dec. 1994 pp 7–16.
Mechanical–Thermal Noise in Micromachined Acoustic and Vibration Sensors, Gabrielson, IEEE Transactions on Election Devices, vol 40, No 5, May 1993, pp 903–909.
Silicon–on–Insulator Water Bonding–Water Thinning Technological Evaluations, Haisma et al., JP J of Applied Physics, vol. 28, No. 8, Aug. 1989, pp. 1426–1443.

*Primary Examiner*—Allan R. Wilson
*Attorney, Agent, or Firm*—Wolf, Greenfield & Sacks, P.C.; James h. Morris; Theodore E. Galanthay

[57] ABSTRACT

The acceleration sensor is formed in a monocrystalline silicon wafer forming part of a dedicated SOI substrate presenting a first and second monocrystalline silicon wafer separated by an insulting layer having an air gap. A well is formed in the second wafer over the air gap and is subsequently trenched up to the air gap to release the monocrystalline silicon mass forming the movable mass of the sensor; the movable mass has two numbers of movable electrodes facing respective pluralities of fixed electrodes. In the idle condition, each movable electrode is separated by different distances from the two fixed electrodes facing the movable electrode.

29 Claims, 4 Drawing Sheets

6,104,073

SEMICONDUCTOR INTEGRATED CAPACITIVE ACCELERATION SENSOR AND RELATIVE FABRICATION METHOD

BACKGROUND OF THE INVENTION

1. Field of the Invention

The present invention relates to a semiconductor integrated capacitive acceleration sensor and relative fabrication method.

2. Discussion of the Related Art

As is known, acceleration sensors are used widely in the car industry for airbags, ABS, active suspensions, engine control and ASR (Anti Slip Rotation). In recent times, electromechanical silicon microstructures fabricated using microelectronics technology have been proposed for use as acceleration sensors, in view of the numerous advantages afforded as compared with traditional macroscopic inertial mechanical switches. The advantages include low cost, high degree of performance and reliability, better signal/noise ratio, integration with memory circuits for forming intelligent sensors and on-line self-test systems, and greater reproducibility and sensitivity.

Prototype silicon-integrated acceleration sensors are currently fabricated in six types substantially differing as to operation:

a) piezoelectric: a mass, moved by acceleration, compresses or stretches a thin film of piezoelectric material, across which a voltage may be detected;

b) piezoresistive: inertial displacement of a silicon diaphragm unbalances a Wheatstone bridge comprising piezoresistive elements diffused in the diaphragm;

c) capacitive: acceleration induces displacement of a seismic mass forming the movable electrode of a single capacitor (absolute variation in capacitance), or of an electrode common to two electrically connected capacitors to vary the two capacitances in opposite directions (differential variation in capacitance);

d) threshold: acceleration-induced inflection of a silicon microbeam closes an electric circuit;

e) resonant: acceleration shifts the intrinsic frequency of an oscillated suspended micromechanical structure;

f) tunnel-effect: acceleration varies the distance between two electrodes, one of which is movable, and hence the quantic tunnel current.

The present invention relates to a differential capacitive acceleration sensor.

Traditionally, integrated microstructures have preferably been fabricated using the bulk micromachining technique, whereby a silicon wafer is processed on both faces to exploit the excellent mechanical properties of monocrystalline silicon. Front-rear processing, however, and the need for particular handling of the wafers make bulk micromachining incompatible with current integrated circuit fabrication technology.

In the mid-80's, surface micromachining was therefore proposed, whereby the sensitive element is formed of polycrystalline silicon, and suspended structures are formed by depositing and subsequently removing sacrificial layers. Details of this are to be found, for example, in the article by W. Kuehnel and S. Sherman entitled "A surface micromachined silicon accelerometer with on-chip detection circuitry" in Sensors and Actuators A 45 (1994) p. 7–16, and in Patent EP-A-O 543 901 filed by Analog Devices, Inc. Though compatible with planar microelectronics technology, the solutions described pose serious problems when releasing the suspended structures (i.e. detaching them from the rest of the semiconductor body) due to the tendency of the micro structures to collapse as a result of the capillarity and Van der Waals forces involved. (Details of this are to be found, for example, in "Stiction of surface micromachined structures after rinsing and drying: model and investigation of adhesion mechanisms" by R. Legtenberg, H. A. C. Tilmans, J. Elders and M. Elwenspock, Sensors and Actuators A, 43 (1994), p. 230–238).

Other highly specialized techniques, such as "wafer dissolving," provide for forming silicon microstructures by means of dedicated processes which are totally incompatible with standard planar microelectronics technology. In a sense, these "ad hoc" processes simply consist of transferring on to silicon what is currently done using other materials, and only provide for fabricating the sensitive portion, so that the processing and control circuit must be formed on a separate chip.

For sensors of a different type, dedicated SOI (Silicon-on-Insulator) substrates have been proposed, wherein the starting wafer comprises a stack of Silicon-Silicon Oxide-Silicon with the oxide selectively removed at the sensor area to form an air gap. The trenches formed from the front of the wafer after contacting the air gap provide for forming the suspended structure. Details of this, relative to a shear stress sensor, are to be found, for example, in the article entitled "A Microfabricated Floating-Element Shear Stress Sensor Using Wafer-Bonding Technology" by J. Shajii, Kay-Yip Ng and M. A. Schmidt, Journal of Microelectromechanical Systems, Vol. 1, N. 2, June 1992. p. 89–94. The bonding technique used (excluding formation of the air gap) is also described in the article entitled "Silicon-on-Insulator Wafer Bonding-Wafer Thinning Technological Evaluations" by J. Hausman, G. A. Spierings, U. K. P. Bierman and J. A. Pals, Japanese Journal of Applied Physics, Vol. 28, N. 8, August 1989, p. 1426–1443.

It is an object of the present invention to provide an acceleration sensor and relative fabrication method, designed to overcome the drawbacks typically associated with currently proposed solutions.

SUMMARY OF THE INVENTION

According to the present invention, there is provided an integrated semiconductor capacitive acceleration sensor and a relative fabrication method. The integrated capacitive acceleration sensor includes a semiconductor body defining a movable mass with movable contacts facing respective fixed contacts. The semiconductor material body has a mono-crystalline sensor region forming the movable mass and the fixed contacts. The fabrication method for the sensor includes forming trenches in the monocrystalline sensor region to define the movable mass, the movable contacts and the fixed contacts.

In practice, according to the present invention, the acceleration sensor is formed in a monocrystalline silicon wafer forming part of a dedicated SOI substrate, in which the trenches formed from the front of the wafer provide for detaching the monocrystalline silicon mass forming the inertial electrode of a group of capacitors.

BRIEF DESCRIPTION OF THE DRAWINGS

A preferred, non-limiting embodiment of the present invention will be described by way of example with reference to the accompanying drawings, in which.

DETAILED DESCRIPTION

Figure 1:
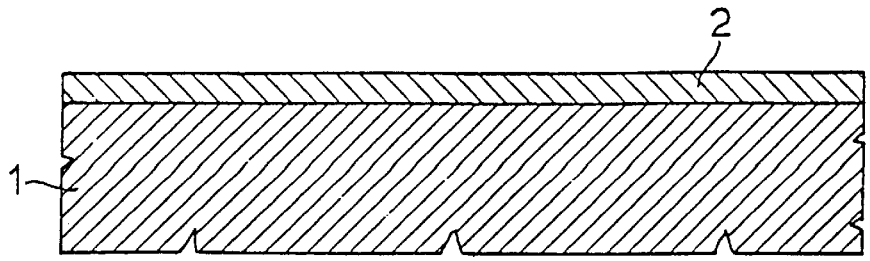
FIGS. 1–5 show cross sections of semiconductor material wafer at successive steps in the fabrication method according to the present invention.
Figure 2:
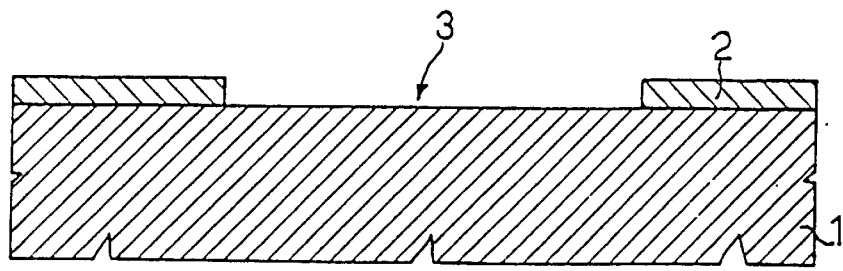
Figure 3:
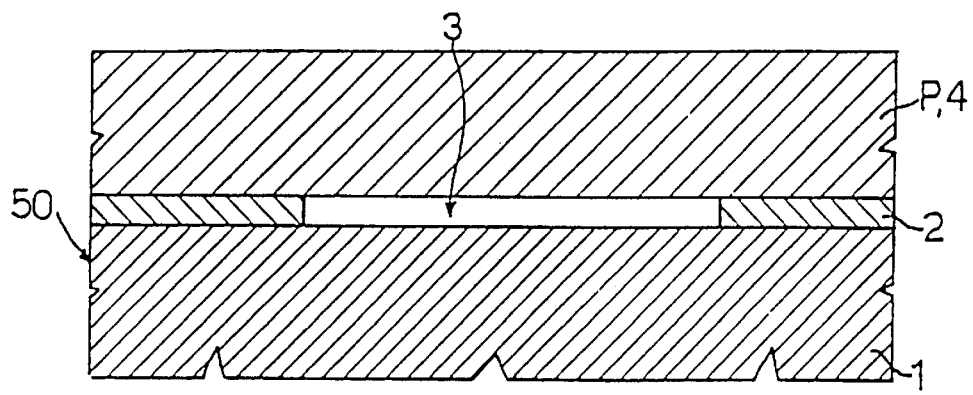

A silicon oxide layer 2 is formed, e.g., grown thermally, on a first wafer 1 of monocrystalline silicon (FIG. 1); oxide layer 2 is masked and etched to selectively remove a portion and form an opening 3 for forming an "air gap" (FIG. 2); and a second wafer 4 of monocrystalline silicon, P-type in the example shown, is bonded to oxide layer 2 using, for example, the method described in the above article by J. Hausman, G. A. Spierings, U. K. P. Bierman and J. A. Pals, to form a dedicated SOI substrate 50 in which the air gap 3 is delimited at the top and bottom by second and first wafers 4 and 1, and laterally by oxide layer 2.

At this point, SOI substrate 50 is processed as usual for forming integrated circuit bipolar and MOS electronic components. More specifically (FIG. 4), second wafer 4 has junction or dielectric isolating regions 5 extending from upper surface 6 of second wafer 4 to oxide layer 2, and a MOS transistor formed in an N-well 10 and including P-type source and drain regions 11, and a control gate region 12 insulated from second wafer 4 by a gate oxide region 14. When forming the electronic components, an N-well 15 is also formed extending deeply up to, and covering practically the whole area over, air gap 3. In practice, well 15 defines a region (intended for housing the sensor) laterally delimited by the rest (4') of second wafer 4, and at the bottom by air gap 3, and is preferably formed simultaneously with the N- or P-well implant step (in the example shown, when implanting well 10) using an appropriately patterned mask.

Figure 4:
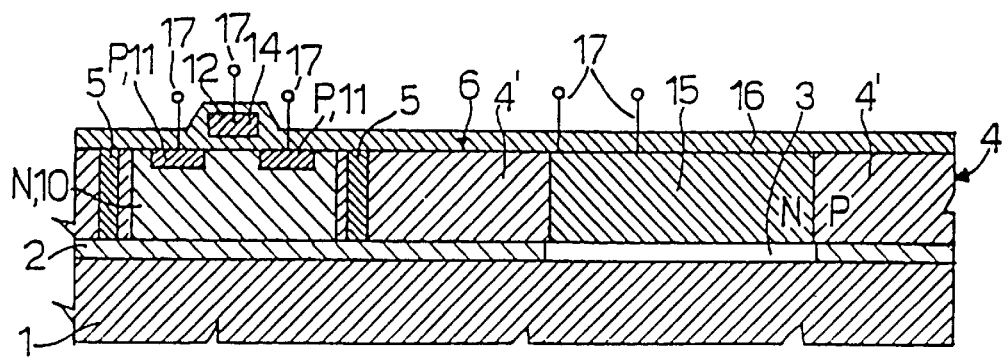

A dielectric protective layer 16 (e.g. of silicon nitride or BPSG—Boron Phosphorous Silicon Glass) is then deposited; the contacts are opened; and a metal layer is deposited and defined to form contact electrodes 17 over second wafer 4, and so obtain the intermediate structure shown in FIG. 4.

Figure 5:
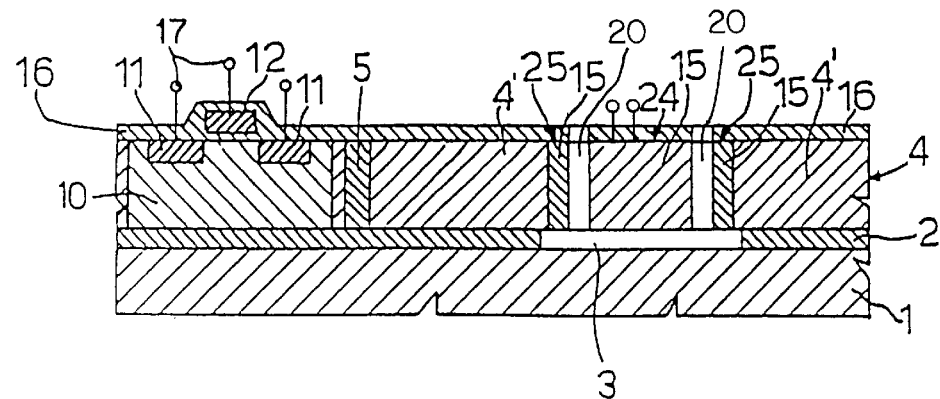

At this point, trenches are formed in second wafer 4 of monocrystalline silicon to release the movable mass 24 of the accelerator, separate the fixed from the movable electrodes, and isolate the different-potential regions, by means of a phototechnical and chemical etching step to remove portions of dielectric layer 16 and of second wafer 4 over air gap 3, and so form trenches 20. (FIG. 5).

Figure 6:
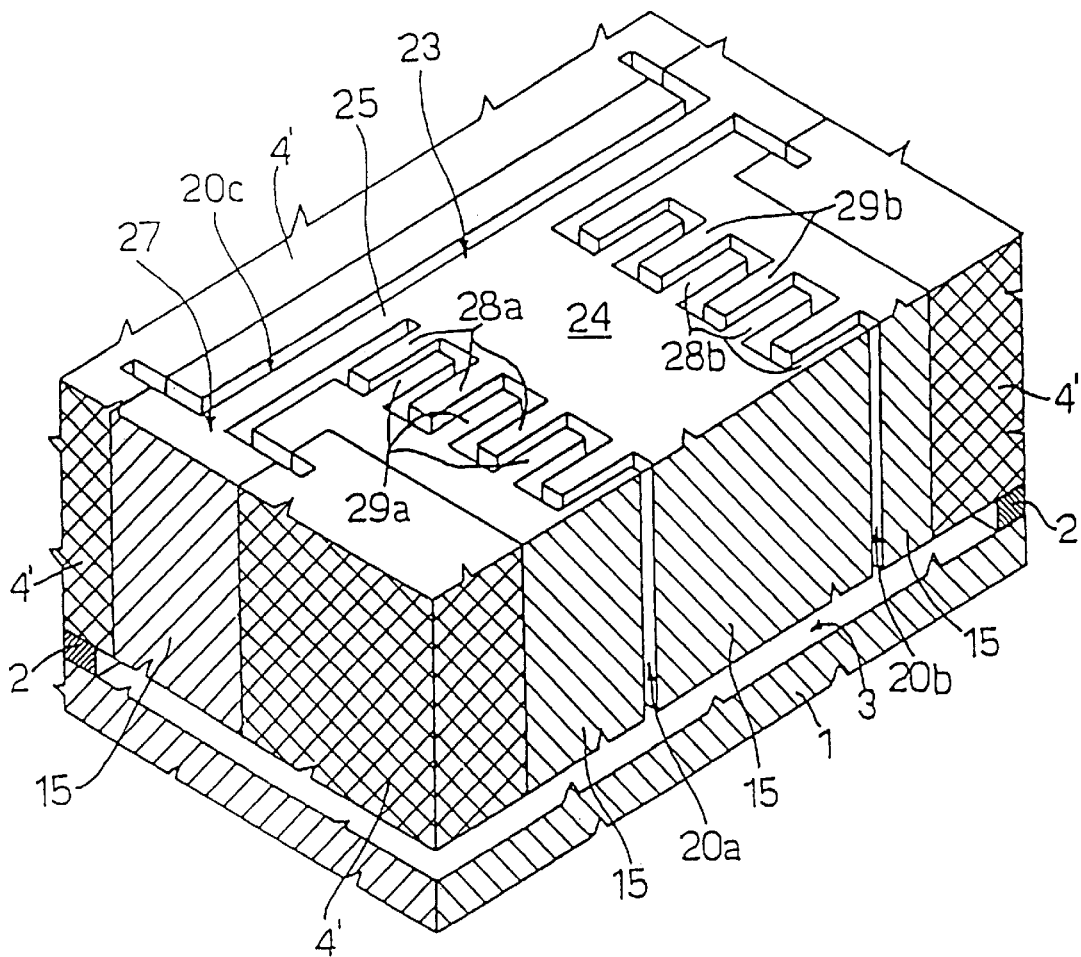
FIG. 6 shows a partial view in perspective of the FIG. 1–5 wafer implementing the sensor according to the present invention.
Figure 7:
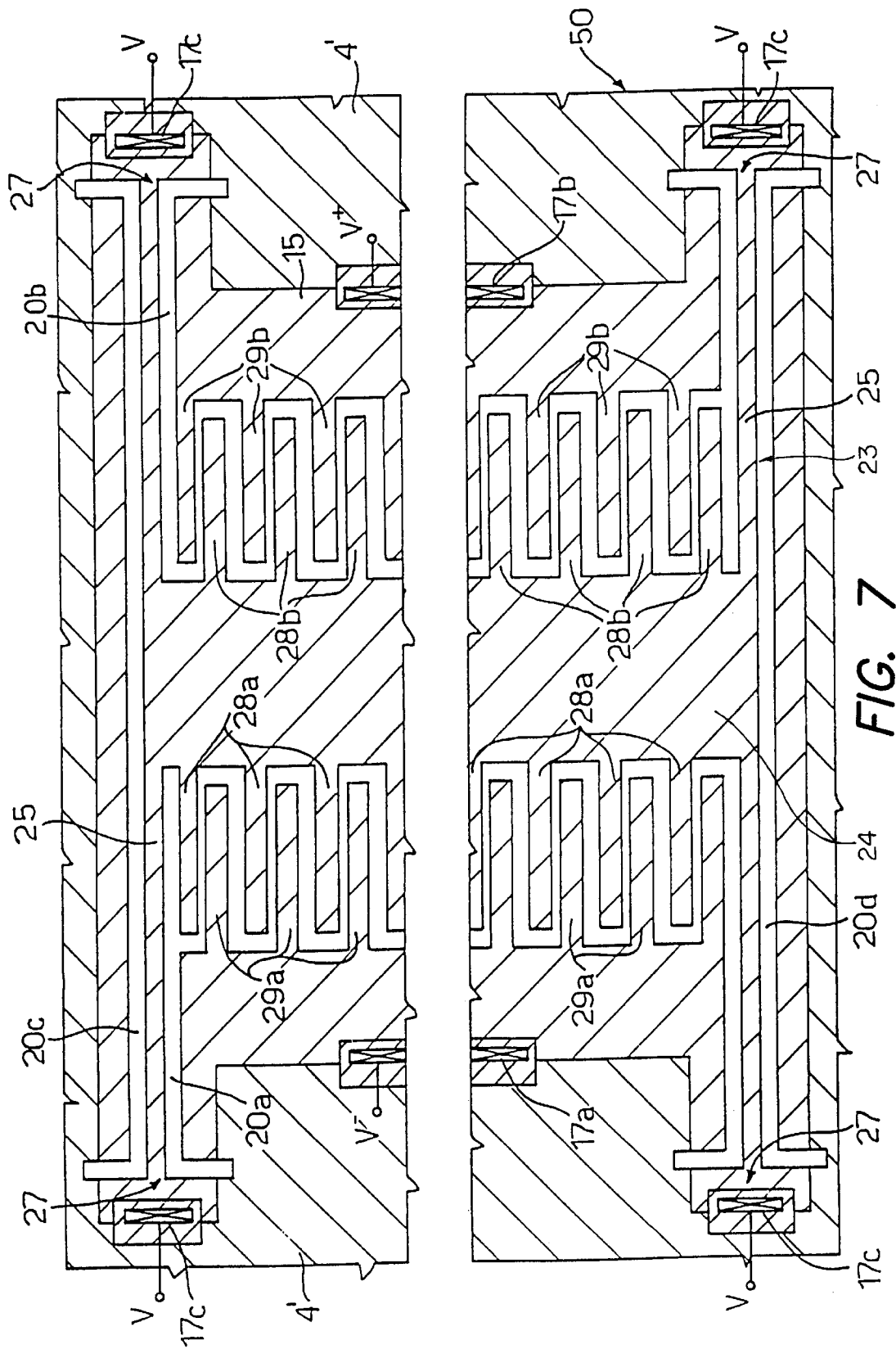
FIG. 7 shows a larger-scale partial top plan view of the sensor according to the present invention.

The actual shape of trenches 20 is shown in the perspective and top plan views in FIGS. 6 and 7. In one embodiment, a first and second trench 20a, 20b define zig-zag electric isolation trenches for separating the movable from the fixed electrodes of the sensor; a third and fourth trench 20c, 20d, define release trenches for releasing the movable structure indicated as a whole by 23; and trenches 20 preferably all extend through N-well 15, thicknesswise from dielectric layer 16 (included) to air gap 3 (FIG. 5), and lengthwise up to outer portion 4' of second wafer 4, beyond the PN junction, to ensure effective isolation of the electrodes, even though this is not strictly necessary in the case of trenches 20c, 20d.

In one embodiment, movable structure 23 is H-shaped, and comprises a beam-shaped movable mass 24, and a pair of transverse arms 25 for anchoring movable mass 24 to substrate 50. Transverse arms 25—known as "springs" by restoring movable mass 24 to the balanced position—are fixed to substrate 50 at the vertical end sides indicated by arrows 27 in FIG. 7. The vertical sides 27 define the fasteners of movable structure 23, and are delimited laterally by trenches 20, at the top by the surface of the device, and at the bottom by air gap 3. A number of transverse walls 28a, 28b extend from each side of movable mass 24, define the movable electrodes of the capacitive sensor, and alternate comb-fashion with respective transverse walls 29a, 29b defining the fixed electrodes.

Fixed electrodes 29a, 29b are biased at two different voltages $V^+$ and $V^-$ by respective contacts 17a, 17b; while movable electrodes 28a, 28b are biased by four contacts 17c adjacent to the ends of transverse arms 25 and at voltage V, where $V^-<V<V^+$.

Figure 8:
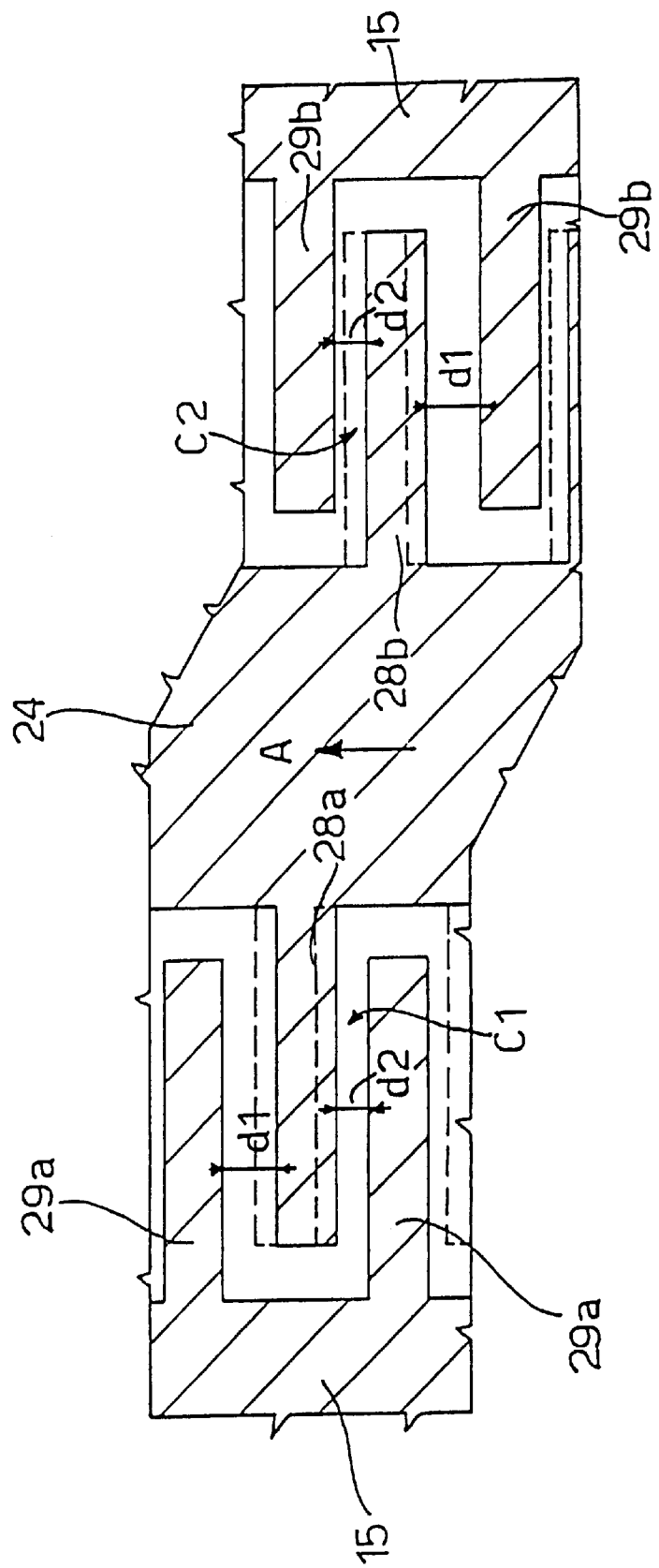
FIG. 8 shows an enlarged detail of FIG. 7.

Each movable electrode 28a, 28b is separated by different distances from the two fixed facing electrodes 29a, 29b. As shown in the enlarged detail of an elementary cell in FIG. 8, in the balanced condition, each movable electrode 28a is separated by distances d1, d2 (where d1>d2) from the two fixed electrodes 29a respectively facing it (in FIG. 8) in a first (upward) direction shown by arrow A, and in a second direction opposite the first; and each movable electrode 28b is separated by distances d2, d1 from the corresponding fixed electrodes 29b (i.e., respectively facing it in the first and second direction).

Each movable electrode 28a, 28b, therefore, forms two parallel capacitors with the two fixed electrodes 29a, 29b facing it at distances d1 and d2. On account of the difference in the two distances, the effective capacitor for each movable electrode 28a, 28b is the one defined with the fixed electrode 29a, 29b at distance d2 (C1 to the left and C2 to the right in FIG. 8). As such, the sensor comprises two capacitors connected in series between terminals 17a and 17b and having a common terminal 17c; and each capacitor in turn comprises the parallel connection of a number of elementary capacitors C1, C2 with the electrodes (at rest) separated by distance d1.

In the presence of acceleration A (shown by the arrow in FIG. 8) parallel to the direction of movable mass 24 and therefore such as to move it from the idle position, shown by the continuous line, to the position shown by the dotted line, distance d1 of capacitor C1 decreases and distance d1 of capacitor C2 increases, thus increasing the capacitance of C1 and reducing the capacitance of C2; this variation in capacitance is detected by the known signal processing circuit integrated in the same chip, and is converted into a voltage for further processing according to the application.

The advantages of the acceleration sensor and fabrication method according to the present invention are as follows. Forming the movable mass of monocrystalline silicon eliminates the tensile and compressive stress to which the sensor is typically subjected in the case of deposited, e.g., polycrystalline silicon films; and, being formed in a monocrystalline silicon wafer, the movable mass is thicker as compared with deposited films, so that the sensor has a higher capacitance, is more sensitive, and involves fewer signal processing problems.

The structure described presents a high degree of flexural rigidity, and, unlike structures formed by removing a sacrificial layer, is therefore less likely to collapse on to the substrate at the drying step following formation of the trenches.

Fabrication of the sensor is fully compatible with planar microelectronics technology, and therefore provides for exploiting the same advantages in terms of reliability and reproducibility; the acceleration sensor and signal processing and control circuits may be integrated monolithically in one chip; and the method, as compared with currently used analog/digital fabrication processes, requires only two additional masks (i.e., for defining the air gap and forming the trenches) and is therefore also economical.

Changes may be made to the sensor and fabrication method as described and illustrated herein without, however, departing from the scope of the present invention. In particular, the electronic components integrated in the same chip may be both bipolar and MOS; and the conductivity of the various regions may be other than as shown.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An integrated capacitive acceleration sensor comprising a semiconductor material body defining a movable mass presenting movable electrodes directly facing respective fixed electrodes, and a PN junction arranged to provide isolation for biasing of said movable and fixed electrodes; said semiconductor material body including a monocrystalline sensor region forming said movable mass and said movable and fixed electrodes.

2. An integrated capacitive acceleration sensor comprising:
   a dedicated SOI substrate including a first wafer of monocrystalline silicon, an insulating material layer over said first wafer, and a second wafer of monocrystalline semiconductor material over said insulating material layer;
   said second wafer including a sensor region comprising movable electrodes directly facing fixed electrodes forming at least one capacitor; and
   a PN junction arranged to provide isolation for biasing of said movable and fixed electrodes, said insulating material layer being interrupted at an air gap defined by said first and second wafers and by said insulating material layer.

3. A sensor as claimed in claim 2, wherein said second wafer includes an upper surface and a lower surface at said air gap and has a first conductivity type; and said sensor region comprises a well of a second conductivity type, extending in said second wafer between said upper surface of said second wafer and said air gap, and laterally delimited by an outer portion of said second wafer.

4. A sensor as claimed in claim 3, further comprising a number of isolation and release trenches extending through said well from said upper surface to said air gap.

5. A sensor as claimed in claim 4, wherein said isolation trenches have ends formed in said outer portion of said second wafer.

6. A sensor as claimed in claim 4 wherein said movable mass is laterally delimited by said isolation and release trenches, and is anchored to said well by elastic arms connected monolithically at end sides.

7. A sensor as claimed in claim 5 wherein said movable mass is laterally delimited by said isolation and release trenches, and is anchored to said well by elastic arms connected monolithically at end sides.

8. A sensor as claimed in claim 1 wherein said fixed and movable electrodes comprise semiconductor material walls arranged comb-fashion; and each movable electrode is located, when idle, at two different distances from two fixed electrodes facing said movable electrode.

9. A sensor as claimed in claim 1 wherein said movable mass is beam-shaped, and has a first and a second side respectively including a first and a second plurality of movable semiconductor material walls forming said movable electrodes and arranged comb-fashion with a first and a second number of fixed semiconductor material walls forming said fixed electrodes; each movable wall in said first plurality is a first distance from a fixed wall facing said movable wall in a first direction, and a second distance from a fixed wall facing said movable wall in a second direction opposite the first direction; each movable wall in said second plurality has said second distance from a fixed wall facing said movable wall in said first direction and said first distance from a fixed wall facing said movable wall in said second direction.

10. A sensor as claimed in claim 9, wherein said first plurality of fixed walls is connected to a first contact to be biased at a first voltage; said first and second pluralities of movable walls are connected to a contact to be biased at a second voltage higher than the first voltage; and said second plurality of fixed walls is connected to a third contact to be biased at a third voltage higher than said second voltage.

11. A sensor as claimed in claim 1 wherein said semiconductor material is silicon.

12. An integrated capacitive acceleration sensor comprising:
   a first wafer of monocrystalline silicon;
   a first layer of insulating material on said first wafer of monocrystalline silicon, said first layer of insulating material having a portion selectively removed therefrom; and
   a second wafer of monocrystalline silicon bonded on said first layer of insulating material, said second wafer of monocrystalline silicon including at least one trench formed therein to define at least one movable and at least one fixed electrode, and a PN junction arranged to provide isolation for biasing of said movable and fixed electrodes.

13. The integrated capacitive acceleration sensor of claim 12 further including a protective layer on said second wafer of monocrystalline silicon.

14. The integrated capacitive acceleration sensor of claim 13 wherein said protective layer comprises a dielectric material.

15. The integrated capacitive acceleration sensor of claim 12 wherein said first wafer of monocrystalline silicon, said first layer of insulating material, and said second wafer of monocrystalline silicon delimit an air gap.

16. The integrated capacitive acceleration sensor of claim 12 wherein said second wafer of monocrystalline silicon is p-type.

17. The integrated capacitive acceleration sensor of claim 12 wherein said second wafer of monocrystalline silicon includes an upper surface and a lower surface near said insulating material, and said PN junction extending from said upper surface to said first layer of insulating material.

18. An integrated capacitive acceleration sensor comprising:
   a semiconductor material including a first layer, an insulating layer and a monocrystalline wafer attached to said insulating layer, said monocrystalline wafer having an upper surface and a lower surface partially in contact with said insulating layer and including at least one trench formed between said upper surface and said lower surface of said monocrystalline wafer to define at least one moveable and at least one fixed electrode; and a PN junction arranged to provide isolation for biasing of said movable and fixed electrodes, wherein said at least one trench defines a movable structure.

19. The integrated capacitive acceleration sensor of claim 18 wherein said movable structure includes a pair of arms to anchor said movable structure to said semiconductor body.

20. The integrated capacitive acceleration sensor of claim 18 wherein at least one set of transverse walls extend from said movable structure.

21. The integrated capacitive acceleration sensor of claim 20 wherein said at least one set of transverse walls define said at least one movable electrode.

22. The integrated capacitive acceleration sensor of claim 21 wherein said at least one set of transverse walls alternate comb-fashion with a second at least one set of transverse walls, said second at least one set of transverse walls defining said at least one fixed electrode.

23. The sensor as claimed in claim 2 wherein said fixed and movable electrodes comprise semiconductor material walls arranged comb-fashion; and each movable electrode is located, when idle, at two different distances from two fixed electrodes facing said movable electrode.

24. The sensor as claimed in claim 2 wherein said sensor region includes a first and a second side respectively including a first and a second plurality of movable semiconductor material walls forming said movable electrodes and arranged in comb-fashion with a first and a second number of fixed semiconductor material walls forming said fixed electrodes; each movable wall in said first plurality is a first distance from a fixed wall facing said movable wall in a first direction, and a second distance from a fixed wall facing said movable wall in a second direction opposite the first direction; each movable wall in said second plurality has said second distance from a fixed wall facing said movable wall in said first direction and said first distance from a fixed wall facing said movable wall in said second direction.

25. A sensor as claimed in claim 23, wherein said first plurality of fixed walls is connected to a first contact to be biased at a first voltage; said first and second pluralities of movable walls are connected to a contact to be biased at a second voltage higher than the first voltage; and said second plurality of fixed walls is connected to a third contact to be biased at a third voltage higher than said second voltage.

26. The integrated capacitive acceleration sensor of claim 12 wherein said at least one movable electrode includes a first and a second set of movable electrodes;

said at least one fixed electrode includes a first and a second set of fixed electrodes;

said first set of fixed electrodes biased at a first voltage;

said first and second set of movable electrodes biased at a second voltage higher than said first voltage;

said second set of fixed electrodes biased at a third voltage higher than said second voltage.

27. The integrated capacitive acceleration sensor of claim 12 wherein said at least one movable and said at least one fixed electrode alternate in comb-fashion with each other.

28. The integrated capacitive acceleration sensor of claim 27 wherein said at least one movable electrode is separated from said at least one fixed electrode in a first direction by a first distance and is separated from said at least one fixed electrode in a second direction by a second distance.

29. The integrated capacitive acceleration sensor of claim 12 wherein said at least one movable electrode forms a parallel capacitor with said at least one fixed electrode.

* * * * *